Oct. 12, 1965

A. H. THIELEN 3,211,332

RECORDER, ELECTRONIC COMPUTER AND PRESELECTOR MECHANISM
FOR LIQUID DISPENSING APPARATUS

Filed Nov. 19, 1963

INVENTOR.
ALAN H. THIELEN

BY

ATTORNEYS

United States Patent Office 3,211,332
Patented Oct. 12, 1965

3,211,332
RECORDER, ELECTRONIC COMPUTER AND PRE-SELECTOR MECHANISM FOR LIQUID DISPENSING APPARATUS
Alan H. Thielen, Sacramento, Calif., assignor to Electro Pump, a corporation of California
Filed Nov. 19, 1963, Ser. No. 324,693
2 Claims. (Cl. 222—20)

My invention relates to means for dispensing quantities of liquid measured in either of several ways and having the capability of interrupting the operation of the apparatus when a desired quantity of liquid has been dispensed. Although the invention relates to this field generally, it has found particular application in the dispensing of gasoline for motorists. It has special use in connection with gasoline dispensing pumps as utilized in service stations.

Most service stations now are provided with dispensing pumps having automatic shut-offs for the gasoline supply, the shut-offs being responsive to liquid level in the vehicle tank being filled. Most of the dispensing devices also give some indication either in gallons or in dollars or both of the amount of gasoline which has been dispensed by the mechanism. The automatic shut-off for the liquid being dispensed and responsive to liquid level in the gasoline tank permits the gasoline station attendant to accomplish other chores while gasoline up to the desired level is being dispensed. There is presently available no way providing a similar automatic operation, permitting the attendant to accomplish other duties, but terminating the gasoline being dispensed at a predetermined point measured either by the number of gallons dispensed or measured by the cash or dollar value of the liquid that has been dispensed.

It is therefore an object of the invention to provide a dispensing device which can be pre-set by the operator and will operate automatically to dispense a given amount of gasoline measured either by the level of fuel in the vehicle tank being filled, or by the number of gallons which has been dispensed or by the number of dollars worth of fuel that has been dispensed.

Another object of the invention is to provide a device of this sort which can readily be incorporated with gasoline dispensing apparatus of the sort now generally utilized in this field.

Another object of the invention is to provide a dispensing apparatus largely electronic in its operation so that it is flexibly adaptable to various designs of gasoline stations, to various designs of liquid dispensing mechanisms and for use under varying circumstances.

Another object of the invention is to provide a device of the sort indicated capable of operation in a preselected way and having various interlocks so that unwarranted and undesired operation cannot occur.

Another object of the invention is to provide a device of the sort indicated that can readily be set or adjusted to accommodate itself to various different rates of cost of gasoline.

Another object of the invention is to provide such a device which not only will afford a visual indication of the quantity of fuel dispensed, measured either in gallons or in dollars, but also will provide a printed record of the transaction.

Another object of the invention is in general to improve dispensing mechanisms for liquids.

A still further object of the invention is to provide an improved recorder, electronic computer and preselector mechanism for liquid dispensing apparatus.

Other objects together with the foregoing are attained in the embodiment of the invention described in the accompanying description and illustrated in the accompanying drawings, in which.

Figure 1:
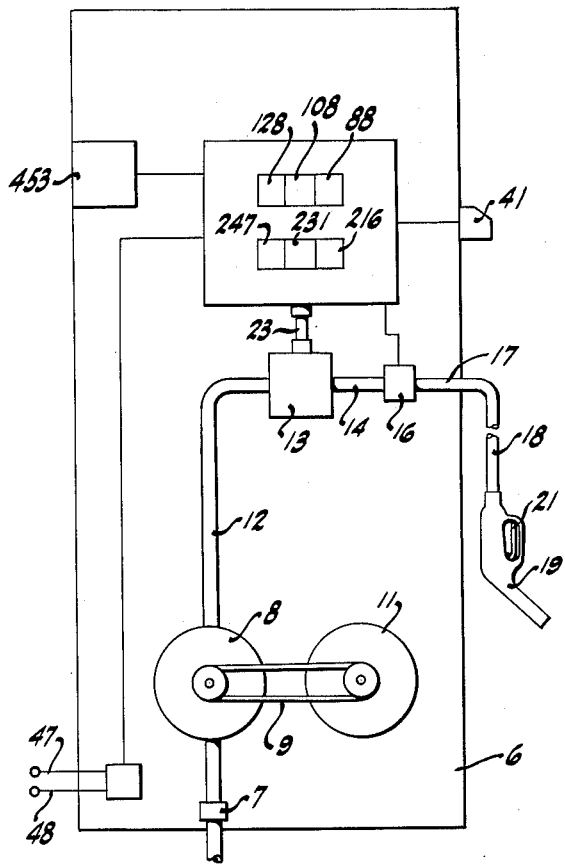
FIGURE 1 is a view of a liquid dispensing apparatus pursuant to the invention, some parts being somewhat diagrammatically illustrated and parts being removed to disclose the interior construction.
Figure 2:
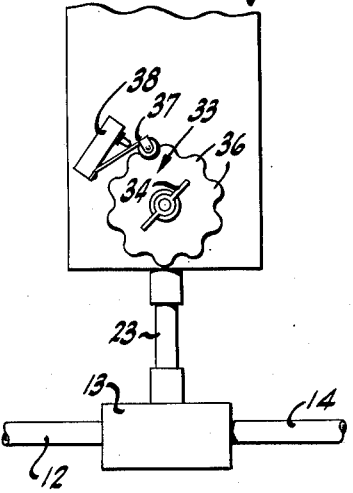
FIGURE 2 is a side elevation of one of the dispensing cams and switch mechanism utilized in the apparatus.
Figure 3:
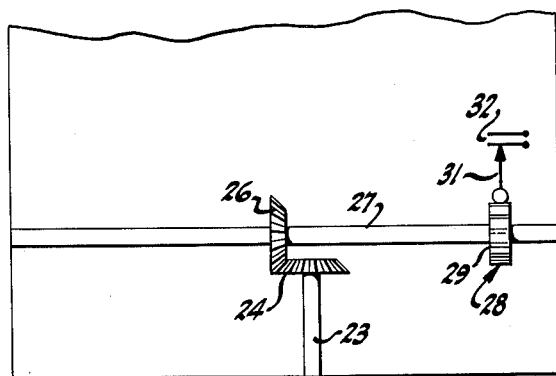
FIGURE 3 is a diagram showing in side elevation part of the driving and pulsing mechanism of the apparatus.
Figure 3:
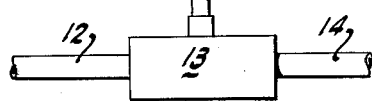

FIGURES 4A, 4B, 4C and 4D when placed in sequence with the left-and right-hand marginal lines in registry afford a complete and connected diagrammatic showing of the electro-mechanical layout of the apparatus.

While the mechanism of the invention can be utilized in various different environments and can be incorporated in a number of different ways depending on the particular duty expected, it has been particularly designed for use as a gasoline dispensing mechanism and is so described herein but merely as an example.

In the preferred form, the device includes a housing 6 in the customary shape and form for location at the customary gasoline dispensing site and includes a connection 7 to a storage tank or other supply of liquid to be dispensed. Mounted in the casing 6 is a gasoline dispensing pump 8 of the customary kind connected by a drive 9 to an electric propelling motor 11. From the dispensing pump 8 liquid flows through a line 12 and into and through a liquid meter 13. The liquid then travels through a pipe 14 and past a control valve 16 into a discharge pipe 17 connected to a flexible hose 18. At its end, the hose carries a hand-operated latching nozzle 19 of the customary sort. The nozzle 19 when not in use can be suspended on the customary interlocking hook (not shown) which inactivates the mechanism.

The nozzle is effective in the usual way to control and stop the liquid flow in response to the liquid level in a vehicle tank into which the nozzle 19 is extended. When the nozzle 19 is operated in the customary way, the operator, by manipulating a handle 21, can attentively control the discharge of fluid, or when the handle 21 is appropriately latched, a liquid level responsive device of a standard sort (not shown) acts automatically to shut off the fuel flow when the liquid level in the vehicle tank has reached a preferred maximum.

In accordance with this invention, particular means are provided for performing extra functions. Pursuant to the present arrangement, the meter 13, impelled by gasoline flowing through the lines 12 and 14, revolves a drive shaft 23 connected by bevel gears 24 and 26 to an operating shaft 27. On the shaft is disposed a tenths gallon impulse cam 28 having ten lobes 29 around its periphery. The cam is connected mechanically through a lever 31 to actuate a spring switch 32 so that the switch 32 is closed and opened ten times for each rotation of the shaft 27. Since the shaft 27 is so geared to the meter 13 as to revolve once for each gallon of fluid flowing through the ducts 12 and 14, the switch 32 affords ten closures or pulses for each gallon passing through the device, and hence affords one pulse for each one-tenth of a gallon.

Also disposed on the shaft 27 is an impulse cam 33 removably mounted on the shaft and held in place by a wing nut 34 so that the cam 33 can readily be changed from time to time. Lobes 36 on the cam 33 are the same in number as the number of cents per gallon of gasoline cost. For example, if gasoline costs 41¢ per gallon, then there are forty-one lobes on the cam 33, and a following lever 37 then actuates a spring switch 38 forty-one times for each rotation of the shaft 27. Thus, there are forty-one impulses per gallon of gasoline or one pulse for each cent of cost. As the price of gasoline varies, the cam 33 is replaced with other cams having a corresponding number of lobes.

Since the device can be operated either by the operator manually controlling the lever 21 or can be operated to stop the dispensing of liquid when a given or preselected cash or dollar value has been dispensed or can be operated to dispense a given quantity of liquid measured by a predetermined number of gallons, there is provided a control box 41 available to the operator at the side of the casing 6 so that an appropriate selection can be made. Disposed in the control box 41 is a selector switch 42 (FIGURE 4D) having a pair of movable arms 43 and 44 ganged together and capable of occupying three positions. In the uppermost position of the switch 42, the circuitry is arranged for operation of the device automatically to cut off the dispensing of liquid when a predetermined cash amount or dollars worth of liquid (measured to the nearest cent) has been dispensed. In the second position of the switch 42, the circuitry is connected to cut off the dispensing of liquid when a predetermined number of gallons (measured to the nearest tenth gallon) have been discharged. In the third, lowermost position of the switch 42, the automatic gallon and dollar cutoff features are excluded and the mechanism is operated manually in the customary way.

The various parts of the mechanism and circuitry can be understood by considering two cases, the first being one in which a given number of dollars worth of liquid is to be dispensed, and second being one in which a given number of gallons of liquid is to be dispensed. Considering the first situation, the operator initially sets the selector switch 42 to the uppermost position, arranging the circuitry to permit response to a further manual setting for a given number of dollars, a given number of dimes, and a given number of cents. Having made such a preselection (later described) and having actuated the switch 42 to "cash" position and having manually closed a main switch 46 (FIGURE 4A), the operator has conditioned the circuitry to place the drive motor 11 in circuitry with a source of electrical power, such as 115 volts A.C., available across terminals 47 and 48. The terminal 47 is joined by a conductor 49 to an A.C. bus 51, whereas the terminal 48 is joined by a conductor 52 to a ground bus 53.

A circuit is traced from the A.C. bus 51 through a fuse 54 and through a normally closed switch 56 to a lead 57 extending through the main switch 46 and a conductor 58 to the motor 11. The other side of the motor is joined by a conductor 59 to the conductor 52, so that the circuit through the motor is established and when the lever 21 is actuated, flow commences. When this occurs, the meter 13 turns the shaft 27 and the revolving cams 28 and 33 physically actuate their respective switches 32 and 38. Since the dollar or cash selection rather than the gallon selection is first being considered, the repeated pulses from the switch 38 are effective upon a "cash" relay coil 61 (FIGURE 4A) connected in circuit with the switch 38 and connected to the buses 51 and 53 by leads (not shown). For each pulse due to a cam lobe 36, the coil 61 is energized and de-energized and is effective correspondingly to close and open the switch 62 of the cash relay. This is joined through a manual switch 63 and a conductor 64 to a lead 66 having a branch 67 extending to the A.C. bus 51. The other side of the cash relay switch 62 is joined by a lead 68 to the primary of a rectifier 69. The other side of the primary of the rectifier is joined by a lead 71 to a conductor 72 extending to a lead 73 connected to the ground bus 53. Thus, the primary of the rectifier is pulsed each time the relay switch 62 is actuated.

The secondary of the rectifier 69 affords 110 volt D.C. pulses, for example to a cash actuating coil 76 through leads 77 and 78. The coil 76 is effective each time to advance a cash gang stepping switch 81 one interval. This stepping switch 81 is a penny or cents stepping switch and includes three decks 81a, 81b and 81c. Each deck includes a decade of contacts 82a, 82b and 82c and a respective one of a plurality of rotating arms 83a, 83b and 83c ganged so that they all operate simultaneously one step for each pulse in the coil 76. The arms 83a and 83b are joined by a lead 84 connected to a conductor 86 joined by a lead 87 (FIGURE 4B) to the line 66 connected to the A.C. bus 51. As the arm 83a lodges on each one of the successive contacts 82, a pulse is sent to a cents digital read-out or display unit 88 of a standard sort and reading in terms of pennies or cents from zero to nine inclusive. The read-out unit 88 has a conductor 89 joined to a lead 91 joined to the lead 73 to the ground bus 53, thus completing this circuit.

Means are provided for effecting a tens-carrying operation to another register. The stepping switch 81 is not only ganged as to the arms 83a, 83b and 83c, but is also extended to operate an on-off switch 92. Normally this switch is off while the arms 83a, 83b and 83c are traversing their zero to nine contact decades 82a, 82b and 82c, but when the arms have gotten to the nine contacts, further movement causes the switch 92 to be moved from its off to its on location. This sets up a circuit through a conductor 93 joined to the lead 77 from the rectifier 69 to a conductor 94 having a connection 96 (FIGURE 4B) to a dimes pulsing coil 97 joined by a lead 98 to a conductor 99 joined to the ground bus 53. When the switch 92 is closed, the coil 97 is operatively connected to the pulse rectifier 69. Thus, the first ten pulses actuate only the cents gang switch 81 for nine times and on the tenth pulse the pulse coil 97 is included. Thereafter, successive pulses from the rectifier 69 simultaneously energize the cents coil 76 and each tenth pulse simultaneously energizes the dimes coil 97.

In a somewhat similar fashion, the dimes coil 97 is effective upon a dimes gang switch 101 joining rotating arms 102a, 102b and 102c of an arrangement having three decks 103a, 103b and 103c. Each of the decks has a decade of contacts 104a, 104b and 104c. The arms 102a and 102b of two decks of the dime gang switch 101 are joined by a lead 106 and a conductor 107 to the conductor 87 extending to the A.C. bus 51. Each of the dimes decade contacts 104a extends to a digital read-out mechanism 108 or display device mounted on the casing 6 alongside the cents read-out device 88. A connection 109 from the dimes digital read-out 108 is joined to a conductor 111 connected along with the conductor 89 to the lead 91 extending to the ground bus. For each step or pulse of the dimes switch arms 102a the dimes digital read-out 108 is appropriately actuated.

Again, a tens transfer mechanism is provided. Connected to the dimes gang switch 101 is an on-off switch 112 normally off. A lead 113 extends from the switch 112 to the conductor 94 and thus to the secondary of the rectifier 69. The on-off switch 112 is joined by a conductor 114 and a lead 116 (FIGURE 4C) to a dollars pulsing coil 117, the other side of which is joined by a lead 118 to an extension of the conductor 111, completing the circuit to the ground bus 53. Thus, after the cents gang switch 81 has been actuated ten times and brings in the dimes gang switch 101 for ten actuations simultaneously therewith, upon the tenth closure thereof, the pulse-off switch 112 effects a further tens transfer and pulses from the rectifier 69 not only continue to actuate the cents gang switch 81 and the dimes gang switch 101, but also successively operate a dollars gang switch 121. This switch 121 includes three decks 121a, 121b and 121c. The decks have switch arms 122a, 122b and 122c operating on decades of contacts 123a, 123b and 123c. The arms 122a and 122b are joined by a lead 124 and a lead 126 to a conductor 127 connected to the lead 66 extending to the A.C. bus 51.

For each pulse of the dollars coil 117, the dollars gang switch 121 is actuated to advance the arm 112a from the zero contact of the decade 123a to the nine contact of its decade 123a. For each contact made, an appropriate display is afforded by a standard digital read-out mechanism 128 disposed alongside the read-out indicators 108 and 88 in the casing 6. The read-out 128 has a lead 129 joined to the conductor 111. A power lead 130 connected to the conductor 127 illuminates a grounded decimal point light (not shown) in the indicators.

By the operation of this mechanism, each cents worth of gasoline traversing the meter 13 causes a pulse due to the cam wheel 33 and the operation of the switch 38, thus actuating the relay contacts 62 and successively counting by cents the quantity passing and affording an indication of cents in the register 88, an indication of dimes in the register 108, and an indication of dollars in the register 128. This mechanism will read up to a total of $9.99. If desired, an additional bank or banks of similar gang switches can be afforded in order to extend the reading to $99.99 or even higher. Presently, a reading just under $10.00 is sufficient.

Pursuant to the invention, the mechanism not only affords a readout, but also is effective to cut off the gasoline flow when a predetermined cash amount of gasoline has been dispensed. This is accomplished through the various gang switch decks 81b, 103b and 121b. The arrangement of the gang switch 81b is such that each cents pulse to each contact of the decade 82b is transmitted by a respective one of a plurality of conductors 131 (a to j inclusive) to a corresponding plurality of switch points 132 of a cents selector switch 133. The cents selector switch has a manually settable arm 134 which can be preset to contact any one of the points 132. This represents a preselection of the desired number of cents worth of gasoline. The presettable cents switch arm 134 is joined by a conductor 136 (FIGURES 4A, 4B, 4C and 4D) extending to a contact point 135 cooperating with one arm 137 of a multiple switch 138.

The arm 137 continues the circuit to an operating coil 139 of a cents relay contact 140. The return from the cents operating coil 139 is by connection to a conductor 141 and a lead 142 to a conductor 143 (FIGURES 4B and 4C) joined to the conductor 91 (FIGURE 4A) extending to the ground bus 53. Thus, when the cents gang switch arm 83b is advanced to a point 82b connected by one of the conductors 131 to a corresponding point 132 of the selector switch 133, then a circuit is completed through the arm 134 and the various connectors to close the relay contacts 140. These contacts are similarly closed for any pulse coming through the preselector lever 134 from zero to nine inclusive, and thus are responsive to any cents worth of gasoline from zero to nine inclusive.

Comparably, the dimes mechanism (FIGURE 4B) is provided with a dimes selector switch 151 having a plurality (ten) of contact points 152 each respectively joined by one of a decade of conductors 153 individually joined to corresponding ones of the contacts 104b. Included in the dimes preselector switch 151 is a manually settable preselector switch arm 154 which can be moved to any one of the points 152. The switch arm 154 is joined by a conductor 156 and a conductor 157 (FIGURE 4C) to a contact 158 (FIGURE 4D) in the multiple switch 138. An arm 159 in that switch is connected by a lead 161 to an actuating coil 162 of a dimes pre-selector relay effective upon a pair of contacts 163 in series with the cents relay contacts 140. The return from the dimes relay coil 162 is through the conductor 141 since the coils 139 and 162 are in parallel. Thus, the selection of any number of dimes worth of gasoline by the lever 154 (from zero dimes to nine dimes, inclusive) is effective to complete a circuit, when the dimes gang switch 101 has appropriately progressed, to afford energization of the coil 162 and closure of the contacts 163.

Figure 4A:
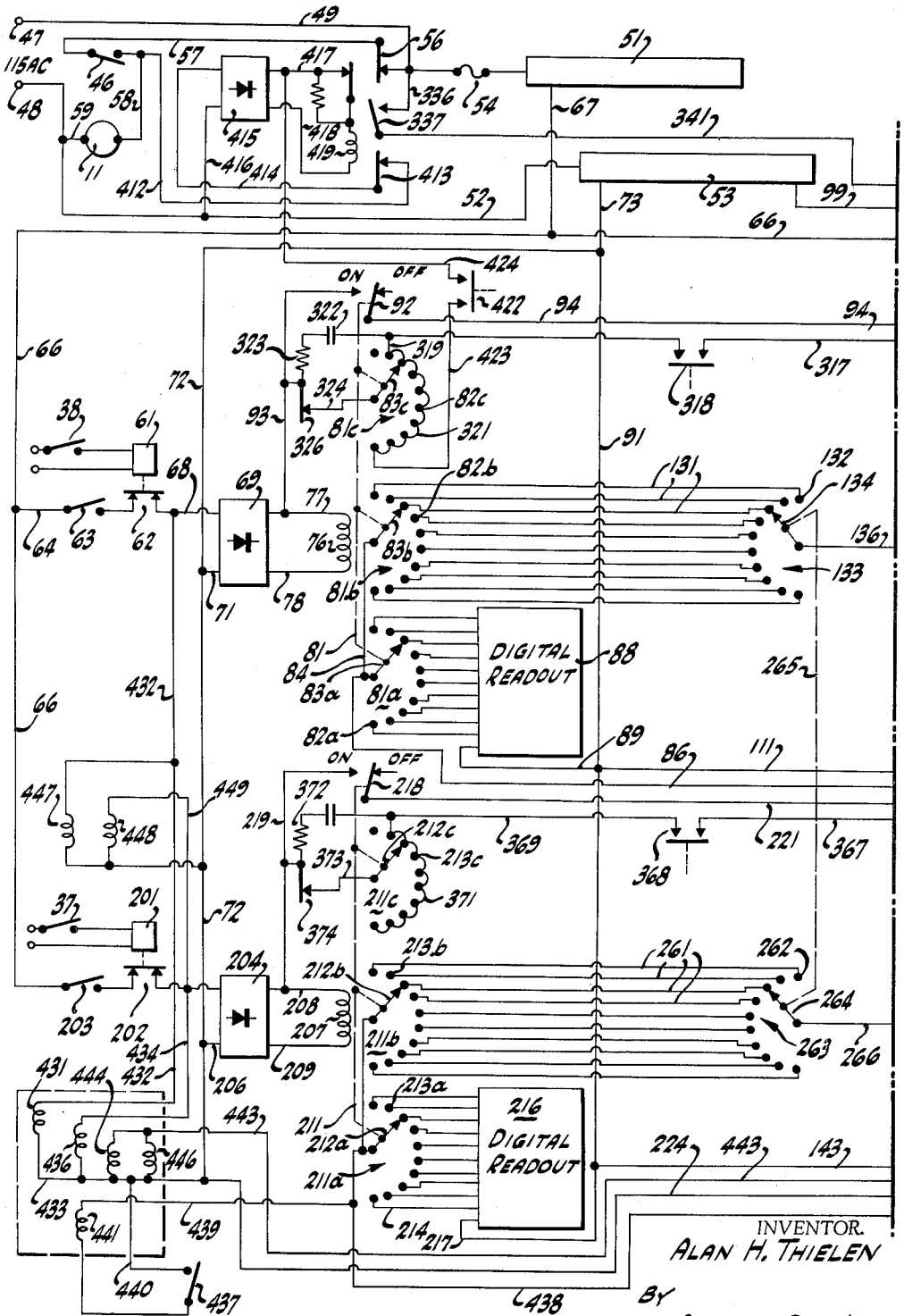
FIGURE 4A is one portion of a circuit diagram showing the electrical connections of the apparatus, certain parts being shown diagrammatically.
Figure 4B:
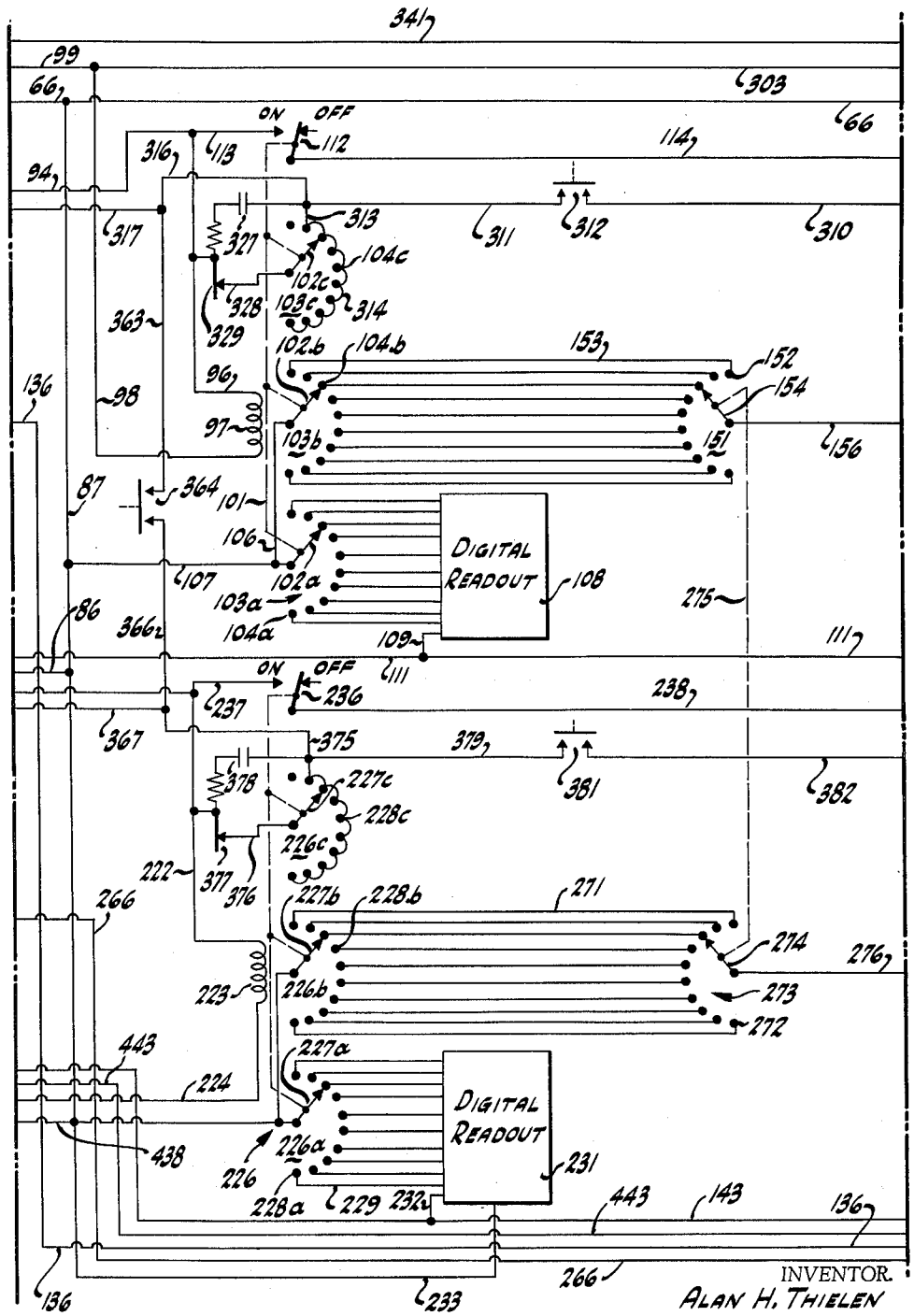
FIGURE 4B is a continuation of the circuit diagram of FIGURE 4A.
Figure 4C:
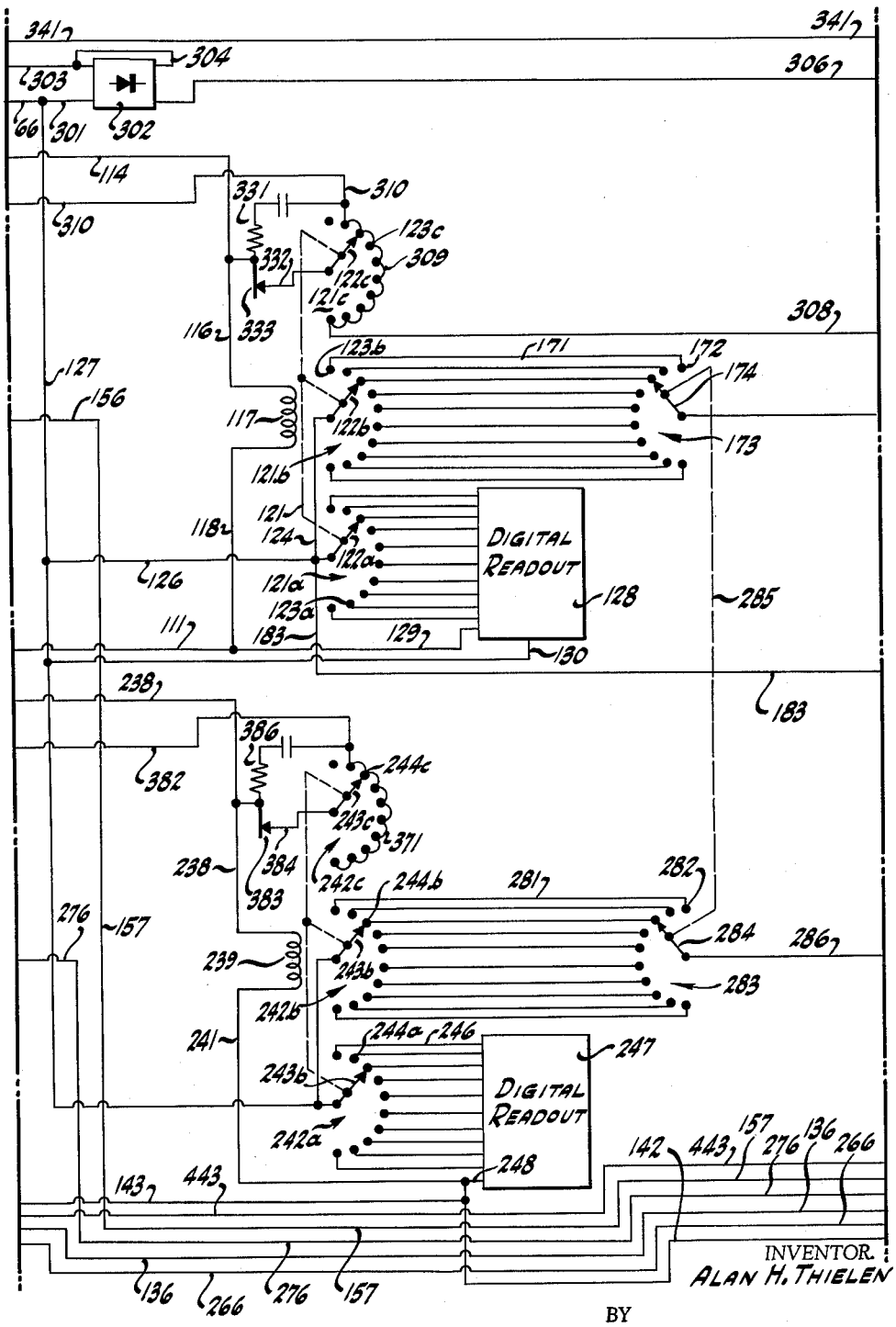
FIGURE 4C is a continuation of the diagrams of FIGURES 4D and 4B.

In a comparable way, the dollar gang switch 121 (FIGURE 4C has in its deck 121b a decade of conductors 171, each of which extends to one of a series of contact points 172 on a dollar preselector switch 173. Within the switch 173 is a manually settable preselector arm 174 movable into abutment with any one of the ten contacts 172 and itself connected by a conductor 176 to a contact 177 (FIGURE 4D) in the multiple switch 138. A switch arm 178 in the switch 138 is joined by a conductor 179 to a dollar relay coil 181 connected in parallel with the coils 139 and 162 by a junction to the conductor 141. The dollar energizing coil 181 is effective upon a pair of relay contacts 182 in series with the cents relay contacts 140 and the dimes relay contacts 163. By the operation of this mechanism, any predetermined number of dollars worth of gasoline can be selected by appropriate setting of the arm 174 and when the gang switch deck 121b attains a corresponding position, the relay contacts 182 are closed.

A circuit for the relay contacts 140, 163 and 182 can be traced from the A.C. bus 51 and the lead 67 to the conductor 66 (FIGURES 4A, 4B and 4C), thence to the conductor 127 and the conductor 126 to a conductor 183 (FIGURE 4C) joined to a lead 184 (FIGURE 4D) and a conductor 186 extending to one of the contacts of the pair 140. The other side of the three pairs of relay contacts is connected to a conductor 187 extending to the selector switch arm 44. Thus, the pairs of relay contacts 140, 163 and 182 constitute in effect an "and" gate so that when a penny impulse, a dime impulse and a dollar impulse have all been received and have been effective to close the three series contacts 140, 163 and 182, the circuit from the A.C. bus is then complete to the selector switch arm 44. Since this switch has initially been set in the uppermost cash or dollars position, the circuit is further traced to a cash contact point 188 and then through a jumper 189 to a gallons contact 191 and a conductor 192. This latter conductor leads through the coil 193 of a latching relay, the other side of the coil being joined to the common conductor 141. The latching coil 193 when energized is effective to open contacts 194 on one side joined by a lead 196 to the conductor 186 and on the other side connected through a lead 197 and a solenoid coil 198 to the conductor 141. When the coil opens the contacts 194, the coil 198 is de-energized, thus closing the valve 16 and stopping the gasoline flow and the impulse cam 33.

In this fashion it is possible by appropriately operating the preselector switch 42 and the main switch 46 and by setting the cents preselector lever 134, the dime preselector lever 154 and the dollar preselector lever 174 and by operating the lever 21 to cause the pump 8 to start, to meter the requisite cash amount of gasoline and then to shut off the mechanism by closure of the valve 16, all in an automatic fashion. In the meantime, the mechanisms 88, 108 and 128 display the precise amount of gasoline being dispensed.

The second case being considered is the arrangement of the preselector switch 42 in its second position for preselection and automatic stoppage in accordance with the number of tenths of gallons, gallons and tens of gallons dispensed. In many respects, this operation is quite similar to that previously described. After the preselector switch 42 is set in intermediate location for this type of operation, the main switch 46 is closed to energize the motor 11 and to start the pump 8. This operates the meter 13 and operates the shafts 23 and 27 to turn the cam 28, affording one pulse for each one-tenth gallon dispensed. The cam-responsive switch 32 closes a circuit appropriately supplied from the A.C. source 47 and 48 by means (not shown) so that a tenths gallon relay coil 201 is energized once for each one-tenth gallon passing through the meter 13.

For each pulse, the coil 201 actuates relay contacts 202. On one side these are in circuit with the conductor 66 leading to the A.C. bus 51 through a switch 203 and on the other side are in circuit to the primary of a rectifier 204. The other side of the rectifier primary has a lead 206 joined to the conductor 72 extending to the ground bus 53. The secondary of the rectifier 204 is shunted by a pulse coil 207 joined to the secondary by leads 208 and 209, so that the coil 207 is pulsed once for each closure of the switch 32. The coil 201 controls the operation of a tenths gallon gang switch 211 including three decks 211a, 211b and 211c, respectively. The decks have switch arms 212a, 212b and 212c and also include decades of contact points 213a, 213b and 213c. The points 213a are connected by a decade of conductors 214 to a digital read-out mechanism 216 of any suitable sort and preferably located in the cabinet 6 for easy reading. The other side of the read-out mechanism 216 is connected by a lead 217 to the conductor 91 extending to the ground bus 53. For each pulse of the cam 28, the gang switch 211 is advanced one step and the points 213a are successively contacted. This produces a sequential read-out in the mechanism 216 in steps of one-tenth of one gallon each.

There is a tens transfer mechanism in that the gang switch 211 is joined to an on-off switch 218 normally in an off position but moved to on position when the arm 212a passes the ninth contact point 213a. A circuit for the switch 218 is inclusive of a conductor 219 joined to the lead 208. The other side of the circuit from the switch 218 is inclusive of a conductor 221 extending to a lead 222 (FIGURE 4B) joined to a gallons pulse coil 223. This is also connected by a conductor 224 to the conductor 72 and the lead 73 to the ground bus 53, so that for each pulse after the first nine pulses from the tenths gallon coil 207, the gallons coil 223 is also energized and the coils 207 and 223 operate simultaneously.

The gallons coil 223 is effective upon a gallons gang switch 226 having three decks 226a, 226b and 226c. The decks respectively have contact arms 227a, 227b and 227c cooperating with decades of contact points 228a, 228b and 228c. The decade of points 228a is connected by a decade of conductors 229 to a digital read-out 231 of standard form and designed to display whole gallons. The read-out 231 has a return by a lead 232 joined to the conductor 143 which leads eventually to the ground bus 53. A grounded decimal point light (not shown) is joined by a power lead 233 to the conductor 87 ultimately connected to the A.C. bus 51.

The gallons gang switch 226 includes an actuator for an on-off tens transfer switch 236 normally in off position but moved to on position when the gang switch 226 exceeds the nine position and requires a tens transfer. The switch 236 is joined by a lead 237 to the conductor 222 and by a conductor 238 to a tens gallons pulse coil 239 (FIGURE 4C). The other side of the coil 239 is connected by a conductor 241 to the conductor 142 and through the conductor 143 to the ground bus 53. Thus, when the gallons tens transfer switch 236 is closed at the tenth position of the switch 226, then the tens gallons coil 239 also is actuated once. This tens transfer operation is similarly repeated upon each attainment of the tens position by the switch 226.

In its turn, the tens gallons pulse coil 239 actuates a tens gallons gang switch 242 including three decks 242a, 242b and 242c. The decks include switch arms 243a, 243b and 243c cooperating with decades of contact points 244a, 244b and 244c. The points 244a are joined by a decade of conductors 246 with a tens gallons digital read-out 247 of standard construction and preferably located in the casing 6 alongside the gallons read-out 231 and the tenths gallon read-out 216. A return from the digital read-out 247 is by a lead 248 to the conductor 142 and the conductor 143 and thus back to the ground bus 53. With the operation of this mechanism, therefore, there is afforded a visual indication by the read-outs 216, 231 and 247 of the numbers of tenths of a gallon, gallons and tens of gallons that have passed through the meter 13.

Mechanism is provided for preselecting the amount of gasoline to be dispensed in tenths of a gallon, gallons and tens of gallons. In connection with the tenths gallon gang switch 211 and particularly the intermediate deck 211b thereof, the various contact points 213b are joined by a decade of conductors 261 to a decade of preselector points 262 in a tenths gallon preselector switch 263. Also included in the switch 263 is a preselector arm 264 which can be manually set to any one of the points 262. If desired, the selector arms 134 and 264 can be mechanically ganged by a bar 265 or left individually movable. A lead 266 extends (FIGURES 4B, 4C and 4D) to a contact point 267 in the multiple switch 138.

Comparably, the gallons gang switch 226 in its intermediate deck 226b is provided with a decade of conductors 271 respectively joined to a decade of points 272 of a gallons preselector switch 273. In this switch is included a movable gallons preselector arm 274 movable into a desired position with any one of the contact points 272. If desired, the switch arms 154 and 274 can be ganged by a bar 275, or left individually operable. The arm 274 is connected by a conductor 276 (FIGURES 4B, 4C and 4D) to a contact point 277 in the multiple switch 138.

Similarly, in the tens gallons gang switch 242 the intermediate deck 242b is provided with a decade of conductors 281 joined to a decade of contact points 282 of a tens of gallons preselector switch 283. This switch includes a manually settable arm 284 movable into electrical contact with any one of the points 282. The arms 284 and 174 may be joined by a gang bar 285, if desired. The arm 284 is joined by a conductor 286 (FIGURES 4C and 4D) to a contact point 287 included in the multiple switch 138. By the settable switches 263 for tenths gallon, 273 for gallons and 283 for tens gallons, it is possible to preselect any desired gallon quantity of gasoline.

Since the contact points (FIGURE 4D) 177, 158 and 135 control the further circuits for actuation of the coils 139, 162 and 181 for the and gate contacts 140, 163 and 182, and since the multiple switch 138 is normally spring pressed so that the switch arms 137, 159 and 178 are in engagement with the cash or dollars contacts, special means are provided for shifting the switch arms 137, 159 and 178 to include the coils 139, 162 and 181 in the proper circuits when the preselection is not by cash or dollars but is by quantity or gallons. When the selector switch 42 is moved from its upper cash position into its intermediate gallons position (FIGURE 4D), the conductor 184 is joined by a middle contact 291 and a conductor 292 to a coil 293 connected by a lead 294 to the return conductor 141. The coil 293 is thus energized and is effective to overcome the spring bias normally holding the multiple switch 138 and shifts all of the switch arms 137, 159 and 178 into their alternative positions to complete circuits through the terminals 267, 277 and 287. Under these circumstances, when the various tenths gallon, gallon and tens gallons gang switches energize circuits because of the pre-positioning of the selector arms 264, 274 and 284, the energized circuits cause pulses in the coils 139, 162 and 181. These coils close the and gate contacts 140, 163 and 182 to energize the coil 193. This opens the contacts 194, de-energizes the solenoid coil 198, and thus causes closure of the control valve 16.

This portion of the mechanism automatically cuts off after having delivered a number of gallons, tenths of a gallon and tens of gallons equivalent to the amount preset in the machine.

When the mechanism has completed the predetermined delivery, either measured in dollars, dimes and cents or measured in tens of gallons, gallons and tenths of gallons, the structure can be manually reset for a subsequent operation.

Figure 4D:
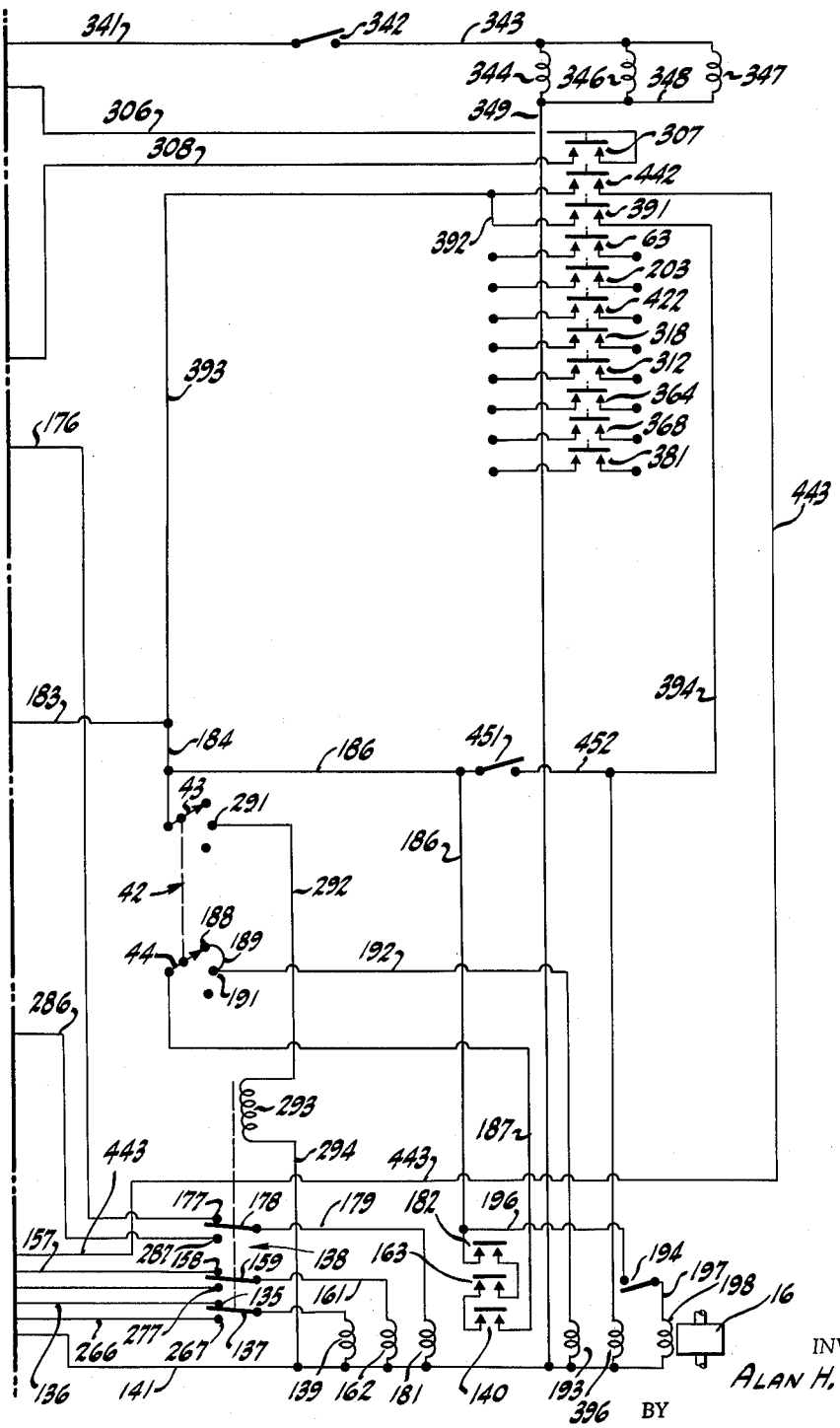
FIGURE 4D is a continuation of the diagrams of FIGURES 4A, 4B and 4C.

As part of the reset mechanism, a circuit is traced from the A.C. bus 51 through the conductor 67 and the conductor 66 and through a lead 301 to the primary of a rectifier 302 (FIGURE 4C). A return lead 303 from the primary joins the ground lead 99 (FIGURE 4B) to the ground bus 53. The secondary of the rectifier 302 has a return lead 304 connected to the return lead 303 and has a D.C. voltage lead 306 extending to one of a pair of normally open relay contacts 307 (FIGURE 4D), the other contact of which is joined by a conductor 308 to the last point 123c of the dollars gang switch 121 in reset deck 121c. All of the points 123c except zero on the deck 121c are connected by jumpers 309. A circuit is then traced through the jumpered points 123c to a conductor 310 extending to a relay 312. For convenience an illustration, a number of relays are shown twice, once in circuit (such as relay 312, FIGURE 4B) and again in a gang actuating position (FIGURE 4D). The relay 312 is joined by a conductor 311 to a lead 313 connected to the points 104c of the reset deck 103c of the dimes gang switch 101. The points 104c, except the zero point, are all connected by jumpers 314. The circuit extends through a connector 316 and a conductor 317 and includes a relay 318. The circuit from the relay extends to a junction 319 with the points 82c of the reset deck 81c of the cents gang switch 81. All of the points 82c, except zero, are likewise connected by jumpers 321.

A spark suppressing network including a capacitor 322 and a resistor 323 is joined to the connector 319 and to the conductor 93 to reduce arcing. Shunting the suppressor network is a lead 324 extending to a self-interrupting switch 326 also joined to the conductor 93. Comparably, with respect to the deck 103c, there is a spark suppressor network 327 joining the connector 313 and the conductor 96. Parallel to the suppressor network and joined to the arm 102c is a lead 328 fastened to a self-interrupting switch 329. Also, in connection with the deck 121c there is a spark suppressor network 331 connecting the conductor 310 and the conductor 116 and also shunting a lead 332 extending to a self-interrupting switch 333.

In order to energize the resetting function, a circuit is traced from the A.C. bus 51 (FIGURE 4A) through the fuse 54 and through a conductor 336 and a switch 337 to a conductor 341 extending to a normally open reset switch 342 (FIGURE 4D). The other side of this switch 342 extends through a conductor 343 to one end of a plurality of actuating coils 344, 346 and 347 connected in parallel to each other by a lead 348 joined to a conductor 349 extending to the conductor 141 eventually connected to the ground bus 53. Thus when the switches 337 (FIGURE 4A) and 342 (FIGURE 4D) are closed, the coils 344, 346 and 347 are energized and serve simultaneously to shift position of all of the ganged relays shown in FIGURE 4D, including the relay 307. When the relay 307 is closed, then power from the rectifier 302 is available through each of the decks 81c, 103c and 121c and correspondingly energizes the stepping coils 76, 97 and 117 to cause the gang switches 81, 101 and 121 to move one step. This movement causes an interruption and reclosure of each of the switches 326, 329 and 333 so that the process repeats until such time as the gang switches 81, 101 and 121 are restored to their initial, zero position ready for further operation.

In a similar fashion, the conductor 316 is provided with a branch conductor 363 extending through a relay 364 and a conductor 366 to a conductor 367 and a relay 368.

A conductor 369 is joined to the relay 368 and to one of the points 213c of the tenths gallons gang switch 211, all of the points, except zero, being connected by jumpers 371. A spark suppressor network 372 extends from the conductor 369 to the conductor 219 and is in shunt with a conductor 373 connected to a self-interrupting switch 374.

As before, when the reset switch 342 is closed and the relay contacts 307 are closed, power is made available on the points 273c of the deck 211c to energize the stepping coil 207. As the gang switch 211 steps, the contacts 374 are interrupted and then closed to repeat the cycle until such time as the gang switch 211 is restored to its initial, zero position. Comparably, in connection with the gallon gang switch 226, power is supplied from the conductor 366 to a conductor 375 to the jumpered points 228c and is effective through a lead 376 on a self-interrupting switch 377. This causes repeated pulses of the stepper coil 223 to restore the gallon gang switch 226 to its original, zero position. A spark suppressor network 378 is connected between the leads 375 and 222 to avoid wearing of the contacts.

In the same fashion, power is made available on the points 244c of the ten gallon stepper switch 242 by conduction through a lead 379, a relay 381 and a conductor 382. All the points 244c, except zero, are jumpered. A self-interrupting switch 383 is connected to the switch arm 243c by a conductor 384. A spark suppressor network 386 shunts the conductors 382 and 238. The power is effective upon the stepping coil 239 to cause step-by-step restoration of the ten gallon gang switch 242 by reason of the intermittent action of the self-interrupting switch 383 until this gang switch likewise is restored to its initial, zero position. Consequently, when the reset switch 342 is closed, all of the gang switches, both for the cash structure and for the quantity structure, are restored step by step to their original condition ready for a subsequent operation.

When the coils 344, 346 and 347 are effective simultaneously to operate the relay 307 and also operate a number of other relays, they simultaneously cause actuation of a relay 391 (FIGURE 4D) on one side having a lead 392 joined to a conductor 393 connected to the lead 183 extending to the A.C. bus 51. The other side of the relay 391 is joined by a conductor 394 to an unlatch coil 396 also connected to the return conductor 141. When the reset function occurs, the relay 391 is closed and the unlatch coil 396 is energized. When energized, the coil 396 closes the contacts 194 which energize the solenoid coil 198 and so open the flow shut-off valve 16 (FIGURE 1). This valve previously was closed by energization of the latching coil 193. The pulse, upon reset, energizes the unlatching coil 396 and restores the cut-off valve to its initial, open position.

An interlock is provided to make sure that the circuits are reset once the pump motor 11 has been turned on and then off. The interlock is also effective to prevent reset when the pump motor 11 is still operating. When the switch 46 is closed to energize the motor 11, a circuit is completed from the A.C. bus 51 through the normally closed switch 56 not only to the motor conductor 58, but also through a conductor 412 to a normally closed switch 413. A conductor 414 connects the switch 413 to one side of the primary of a rectifier 415, the other side of which is joined to the ground bus through a conductor 416. The secondary of the rectifier 415 supplies 110 volt D.C. through leads 417 and 418 to a cam switch coil 419. This coil when energized is effective to cock the cam switch. When the switch 46 is opened thereafter, the cocked cam switch is released, simultaneously opening the switches 56 and 413, thus preventing operation of the motor 11 upon mere reclosure of the switch 46, and simultaneously closing the switch 337, thus supplying energy through the conductor 341 to the switch 342

(FIGURE 4D) and making that switch active when closed for resetting.

When the switch 342 is closed and the coils 344, 346 and 347 are energized to shift all of the relays and switches illustrated in the upper right-hand corner of FIGURE 4D, a relay 422 (FIGURES 4A and 4D) closes a circuit from the conductor 319 and the jumper 321 through a conductor 423 and a conductor 424 to the lead 417. Thus, an energy pulse is given to the coil 419 upon the reset switch 342 being closed, the coil latching mechanism being thus cocked. When the circuit is subsequently opened, the latch is released. The previously closed switch 337 is opened, and the previously open switches 56 and 413 are closed. In this way, the circuits are set up or reset for further operation when the motor switch 46 is again closed.

Means are also provided to print a cash receipt. This means is largely illustrated diagrammatically in FIGURE 4A. Controlled by the closure of the switch 62 is the energization of a coil 431 joined in the switch circuit by a conductor 432 and connected to a return line 433 extending to the conductor 72 leading to the ground bus 53. Each time the switch 62 is closed, the coil 431 is afforded a single pulse. Similarly, the contacts 202 are joined by a conductor 434 to a coil 436 also joined to the return line 433. The coil 436 is pulsed once for each closure of the contacts 202. The coils 431 and 436 are representative of actuators for a printing wheel array (not shown) complete with tens transfer mechanism and of a standard sort. The printing wheels are advanced in accordance with the indications in the read-out devices to indicate the number of gallons and the number of dollars involved in the transaction. When a manual switch 437 is closed, a circuit is completed from the A.C. bus 51 through the conductors 67, 66, 87 (FIGURE 4B), 438 and 439 to a coil 441. The other side of the coil 441 is joined through the switch 437 and a lead 440 to the return conductor 433. The coil 441 when energized is effective to cause a printing operation on a previously inserted sales slip.

When the reset switch 342 (FIGURE 4D) is closed, among the other relays are closed the contacts of a relay 442 (FIGURE 4D) on one side joined to the conductor 393 and on the other side having a conductor 443 extending to a pair of reset coils 444 and 446 also joined to the return conductor 433. When energized, the coils 444 and 446 reset the printing counter wheels for the gallon indication as well as the printing counter wheels for the dollar indication.

Also included in the gang of relays illustrated in FIGURE 4D are the switches 63 and 203 (FIGURE 4A). When these are open, they isolate the power source to make sure that the dispensing control circuits cannot be completed during reset.

In a somewhat similar fashion, there is provided a coil 447 (FIGURE 4A) at one end connected to the printing wheel conductor 432 and at the other end connected to the return conductor 72 for actuating a totalizer (not shown) for keeping a total of the number of dollars registered by the device. Comparably, a coil 448 is joined by a conductor 449 to the output of the contacts 202 and is joined to the return conductor 72 so that a totalizer (not shown) is appropriately actuated to keep account of the total number of gallons dispensed by the device.

Upon occasion, a customer may change his mind after the machine has initially been set for a given dollar amount or a given gallon amount of gasoline. If this change is communicated to the operator after the coil 198 (FIGURE 4D) has closed the shut-off valve 16, it is impossible to continue pumping without a resetting operation and a new start. To alleviate this cumbersome procedure, there is provided a special switch 451 (FIGURE 4D) at one side connected to the conductor 186 and at the other side connected by a lead 452 to the conductor 394. When the switch 451 is manually closed under the special circumstance described, a pulse is transmitted to the unlatching coil 396 and the valve 16 is thus opened for further operation and shut off by any of the several means.

It is preferred, in the physical embodiment of the device, to arrange many of the parts, particularly the reset switch 342 and comparable manually controllable parts, in the control box 41 for ready accessibility. The printing and credit card mechanism, such as the switch 437 and associated parts, are particularly disposed in a special compartment 453 convenient for access.

What is claimed is:

1. A recorder, electronic computer and preselector mechanism for liquid dispensing apparatus including a liquid pump comprising an electric motor for operating said liquid pump; a liquid meter connected to receive liquid from said liquid pump; an electrically controlled valve connected in the discharge of said liquid meter; means responsive to the operation of said liquid meter for producing electrical pulses in accordance with the flow of liquid through said meter; a plurality of means connected in series for accumulating the number of said electrical pulses by tens in successive orders; a plurality of means for preselecting any number of said electrical pulses in each order; and means in series and responsive to electrical pulses of the preselected number from each of said accumulating means for actuating said electrically controlled valve to stop the flow of said liquid, each of said accumulating means including three decks of contact decades, means for ganging said decks for operation in unison, an indicator, means for connecting one of said decks to said indicator, a preselector, means for connecting another of said decks to said preselector, a resetting means for all of said decks, and means for connecting said resetting means to said one of said decks.

2. A recorder, electronic computer and preselector mechanism for liquid dispensing apparatus including a liquid pump comprising an electric motor for operating said liquid pump; a liquid meter connected to receive liquid from said liquid pump; an electrically controlled valve connected in the discharge of said liquid meter; first means responsive to the operation of said liquid meter for producing electrical pulses in accordance with the number of tenths of gallons of liquid flowing through said meter; a first accumulator responsive to said electrical pulses from said first means for accumulating the number thereof; first means for preselecting any number of accumulated electrical pulses in said first accumulator; second means responsive to the operation of said liquid meter for producing electrical pulses in accordance with the number of cents worth of liquid flowing through said meter; a second accumulator responsive to said electrical pulses from said second means for accumulating the number thereof; second means for preselecting any number of accumulated electrical pulses in said second accumulator; settable means for connecting either said first means for preselecting or said second means for preselecting to actuate said electically controlled valve to stop the flow of said liquid; and means for printing the condition of said first means for accumulating and said second means for accumulating.

References Cited by the Examiner

UNITED STATES PATENTS

| | | | |
|---|---|---|---|
| 2,998,188 | 8/61 | Mast et al. | 235—92 |
| 3,115,275 | 12/63 | Hynd | 222—20 |
| 3,122,271 | 2/64 | Grant | 222—17 |
| 3,138,289 | 6/64 | Jones et al. | 222—20 |

LOUIS J. DEMBO, *Primary Examiner.*